Nov. 3, 1964
I. MAVROVIC
3,155,722
RECOVERY OF RESIDUAL AMMONIA AND CARBON
DIOXIDE IN THE SYNTHESIS OF UREA
Filed Jan. 29, 1960
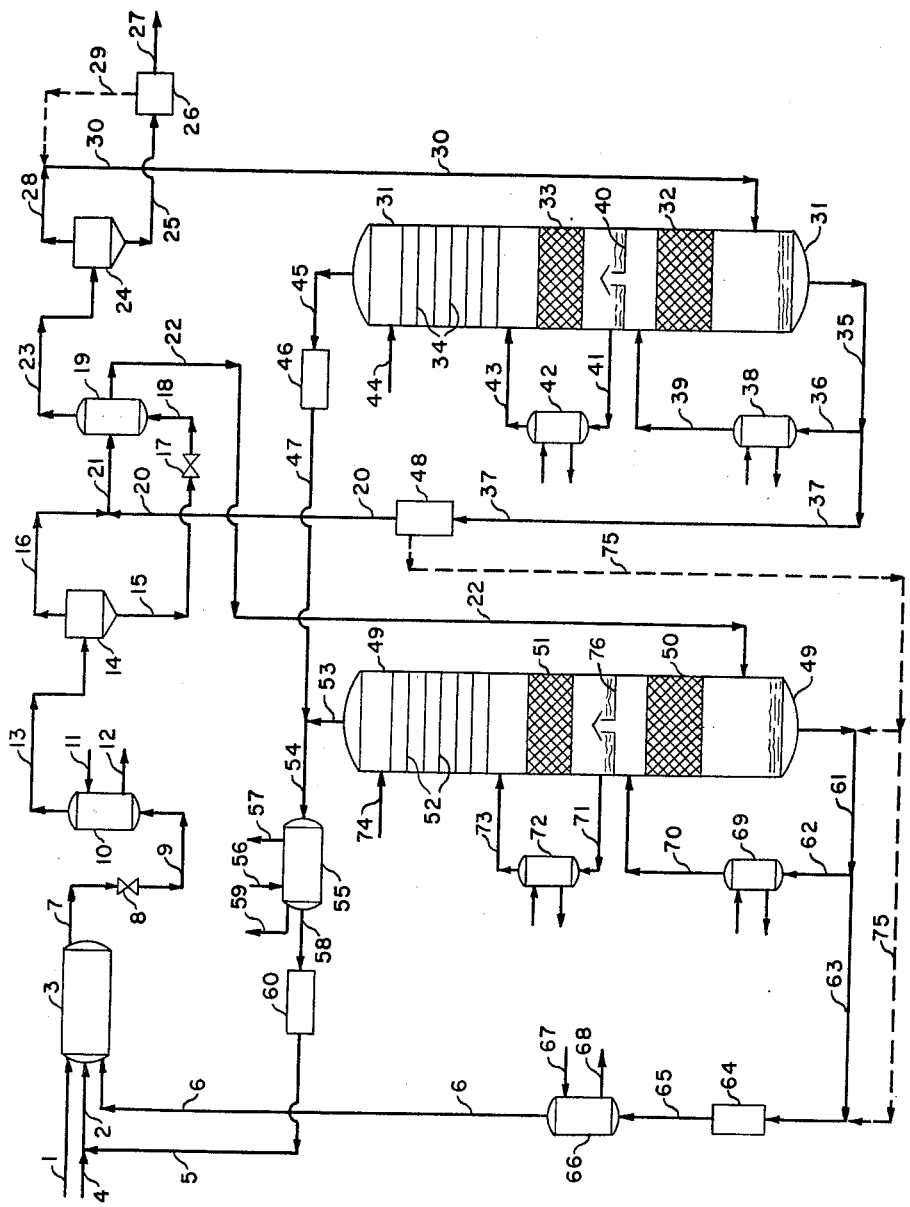
IVO MAVROVIC
INVENTOR.
BY J. L. Chaboty
'AGENT

United States Patent Office 3,155,722
Patented Nov. 3, 1964

3,155,722
RECOVERY OF RESIDUAL AMMONIA AND CARBON DIOXIDE IN THE SYNTHESIS OF UREA
Ivo Mavrovic, New York, N.Y., assignor to Chemical Construction Corporation, New York, N.Y., a corporation of Delaware
Filed Jan. 29, 1960, Ser. No. 5,379
4 Claims. (Cl. 260—555)

This invention relates to urea synthesis processes in which the urea reactor effluent is freed of unconverted ammonium carbamate in two stages of decomposition, usually at two successively lower pressure levels. A new process of off-gas treatment has been developed, which permits complete recycle of unconverted process components in a highly economical manner. The off-gases are partially condensed by a process which produces residual ammonia gas streams free of carbon dioxide and suitable for recycle. A residual aqueous ammonia-ammonium carbamate solution is also produced and recycled to urea synthesis. Considerable improvement in operating economy is achieved in the present invention, since power requirements are considerably reduced due to a novel combination of process steps whereby large scale gas recompression is avoided. In addition, the process of the present invention avoids other drawbacks of prior complete recycle processes, such as process stream dilution or the use of a carrier medium for ammonium carbamate recycle.

Urea is synthesized commercially by the reaction of ammonia with carbon dioxide at elevated pressure and temperature. In this process ammonium carbamate is formed as an intermediate compound, which upon loss of water yields urea. The reaction proceeds according to the following equations:

(1) 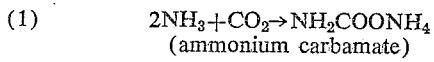
   (ammonium carbamate)

(2) 

Equation 1 shows the formation of the intermediate compound ammonium carbamate. This is a rapid reaction under the usual process conditions, and readily goes to completion. However, Equation 2, the dehydration of ammonium carbamate to yield urea and water, is a comparatively slow reaction under the usual process conditions, and does not readily go to completion in practice. Thus the effluent from the high-pressure urea synthesis vessel contains a significant proportion of ammonium carbamate as well as urea product. The ammonium carbamate is readily separated from the liquid urea product by heating, which decomposes the ammonium carbamate by a reversal of Equation 1 and generates an off-gas containing ammonia and carbon dioxide. The subsequent processing of this off-gas is relatively difficult, since at lower temperatures and pressures the components ammonia and carbon dioxide readily recombine to form ammonium carbamate as a solid. Various procedures for disposal or recycle of the off-gas have been devised in the past.

One of the earliest commercial processes involved the complete recycle and recompression of the off-gas stream as a gas at elevated temperature. Various mechanical difficulties were encountered due to the condensation of solid carbamate and accelerated corrosion. The basic power requirements were high, due to inherent low efficiency in compressing large volumes of hot gas to high pressure.

Other processes involve recycle of the gases after condensation in a liquid solution or slurry. An aqueous slurry process was one of the earliest commercial procedures, and the use of an inert mineral oil as a slurrying agent for solid carbamate recycle forms the basis of another more recent process. Another process of current interest recovers and absorbs the entire off-gas in a scrubbing solution comprising liquid ammonia, with the possible addition of water as a subsequent scrubbing agent. These procedures result in excessive dilution of the process stream hence output per unit of autoclave volume is reduced and larger pressure vessels must be provided. When excess water is added, the yield or percent of ammonium carbamate dehydration is also reduced.

Finally, a group of processes is known, which completely separate the components of the mixed off-gas stream, usually by selective absorption. Either ammonia or carbon dioxide is completely absorbed, independent of the other component. Subsequent regeneration of the absorbent solution liberates a pure gas stream which is then readily recycled to the process. The residual component which remains in the off-gas stream after absorption is also independently recycled to the process. High power and thermal requirements due to the necessity of an extra absorption-regeneration cycle are a major objection to this type of process.

Thus a broad range of technical solutions to the problem of off-gas recycle is available. However, it has been unexpectedly found that according to the present invention high yields of urea can be obtained in a full recycle process without disadvantages inherent in other types of process as described above. The process which forms the subject of this invention provides a full utilization of ammonia and carbon dioxide in the synthesis and furthermore provides conservation of heat and power.

Another significant advantage of the present invention is that water from an external source is not required to dissolve the recycling carbamate being returned to the synthesis step. An additional advantage of the present invention is that off-gas pressure levels are conserved, and consequently power requirements for gas recompression are sharply reduced.

It is an object of this invention to provide an improved process of urea synthesis.

Another object is to produce urea in a complete recycle process which does not produce a net off-gas.

A further object is to process and recycle off-gas produced by ammonium carbamate decomposition in an improved and more efficient manner.

An additional object is to provide a urea synthesis process which permits recycle of unconverted material without addition of water from an external source into the process stream.

Still another object is to recycle off-gas produced from two-stage ammonium carbamate decomposition at two different pressure levels in a more efficient manner with reduced gas recompression power requirements.

These and other objects of this invention will become apparent from the description which follows.

The present invention is primarily directed to urea synthesis processes in which two-stage decomposition of ammonium carbamate is effected at two pressure levels succeedingly lower than synthesis pressure. Since this is the conventional and most economical procedure, the process of the present invention is widely applicable to existing installations as well as new facilities.

In the process according to this invention, the hot second stage off-gas stream derived at low pressure and containing ammonia, carbon dioxide and water vapor, is contacted with cool recirculating aqueous ammonium carbamate solution containing excess ammonia. This contact is accomplished by scrubbing the gas stream in the lower packed section of a condenser-stripper vessel. The scrubbing step condenses the major portion of water vapor from the gas stream together with some ammonia, however, the most important effect of this step is that it strips most of the carbon dioxide content from the gas stream, thus leaving an ammonia-rich gas stream. This residual ammonia-rich gas stream is further scrubbed in additional packed and bubble-cap sections, leaving an ammonia exit gas free of carbon dioxide. This ammonia gas stream is separately compressed, condensed and recycled to the process in the ammonia feed section.

The initial scrubbing step cools the gas stream as well as condensing and stripping water, ammonia, and carbon dioxide. A major portion of the heated scrubbing liquid is externally cooled and recycled. The balance of this liquid stream is drawn off as an ammonia-ammonium carbamate solution, which is then raised to a high pressure and utilized to contact and partially absorb the high pressure off-gas derived from the first stage of ammonium carbamate decomposition. This contact between the first stage off-gas and the liquid solution results in the generation of heat, and takes place while in heat exchange with the urea stream in the second stage of carbamate decomposition. Thus the heat which is generated serves to provide the necessary heating for final carbamate decomposition.

The mixed gas-liquid stream resulting from this gas-liquid contact is scrubbed with a cool recirculating aqueous ammonia-ammonium carbamate solution in the lower packed section of a second condenser-stripper unit operated at high pressure. This scrubbing step separates liquid leaving a residual gas stream, and in addition strips most of the carbon dioxide from the gas stream, together with some ammonia and water vapor. The residual ammonia-rich gas stream is further scrubbed in additional packed and bubble-cap sections, leaving a high-pressure ammonia exit gas free of carbon dioxide. This ammonia gas stream is readily condensed without compression, and is recycled to the process in the ammonia feed section.

This high-pressure treatment of the mixed gas-liquid stream thus produces a high-pressure ammonia recycle stream in a most economical manner. In addition, the initial scrubbing step heats up the scrub solution as well as absorbing part of the mixed liquid-gas input stream into the liquid scrub solution. Consequently, a portion of the heated scrubbing liquid is externally cooled and recycled. The balance of this liquid stream is drawn off as a concentrated ammonia-ammonium carbamate solution, and is subsequently compressed and recycled to urea synthesis to join the main stream of ammonium carbamate formed by reacting incoming ammonia and carbon dioxide. Thus readily compressible streams are recycled, and power requirements are sharply reduced since gas recompression is limited to the low-pressure ammonia gas derived from the second stage off-gas. The only streams leaving the system are the product urea solution and the inerts discharged after ammonia condensation. Excessive dilution of process streams is avoided, since no additional external components are added to the process.

A detailed description of the operation of the process of the present invention follows. Referring to the figure, incoming carbon dioxide feed stream 1 and ammonia stream 2 are passed into high pressure urea synthesis reactor 3, with the total ammonia feed stream 2 consisting of incoming stream 4 combined with recycle ammonia stream 5. Recycle stream 6, consisting of a concentrated aqueous ammonia-ammonium carbamate solution, is also passed into reactor 3. Within reactor 3, ammonia and carbon dioxide combine to form ammonium carbamate, and a portion of the ammonium carbamate dehydrates to yield urea. The pressure and temperature ranges for urea synthesis within reactor 3 are well known, thus the pressure within reactor 3 will be about 2000 to 6000 p.s.i.g. while the temperature will be in a range between about 320° F. to 430° F. Reactor 3 may be suitably disposed to provide either horizontal or vertical flow of reactants, in accordance with known urea synthesis reactor design. The overall molar feed ratio of reactants is also a matter of selection and may vary from slightly above the stoichiometric 2 to 1 molar ratio of ammonia to carbon dioxide up to about 5 to 1, or even higher. In general, ratios higher than about 5 to 1 are considered not economical from a practical point of view, since it becomes necessary to provide a special vessel for the preliminary separation of excess ammonia from the reactor effluent, prior to ammonium carbamate decomposition. Of course it should be understood that the process of the present invention is also readily applicable to such processes, as will appear from the following section of the process description.

The process stream now leaves reactor 3 via line 7. This stream will contain about 20% to 40% urea, with the balance consisting mainly of ammonium carbamate, ammonia and water. Specific proportions of these components will be a function of the aforementioned operating variables. Stream 7 is first passed through pressure reducing valve 8 whereby process stream pressure is reduced to a level of between about 200 p.s.i.g. to 400 p.s.i.g., prior to the first stage of ammonium carbamate decomposition. The specific pressure selected will depend on engineering considerations in a particular case. The stream now passes via line 9 to vessel 10, which is the first stage of a two-stage ammonium carbamate decomposition system. Vessel 10 is a steam-heated shell and tube heat exchanger, with steam entering the shell via 11 and condensate leaving via 12. The process stream 9 passes through the tubes of vessel 10, and due to the application of heat at the reduced pressure a major portion of the ammonium carbamate present decomposes into ammonia and carbon dioxide. The temperature of the process stream inside vessel 10 will depend on the particular operating pressure. Thus at 400 p.s.i.g., stream temperature will be from about 275° F. to 300° F., while at 200 p.s.i.g. the stream temperature will be maintained at from about 240° F. to 265° F. Lower temperature is feasible at the lower pressure since ammonium carbamate is more readily decomposed at a lower pressure. The resulting process stream leaves via 13 and passes into decomposer-separator 14.

Vessel 14 is a known type of gas-liquid separator, in which stream 13 is divided into a liquid stream 15 consisting of urea, water and residual ammonium carbamate, and a gas stream 16 containing excess ammonia plus ammonia and carbon dioxide derived from the first stage of carbamate decomposition. The impure liquid product stream 15 is passed through pressure reducing valve 17, whereby stream pressure is reduced to a suitable level for final and complete ammonium carbamate decomposition. A pressure level in the range between 5 p.s.i.g. and 50 p.s.i.g. is suitable for this second and final stage of decomposition.

The product stream, now at a suitable reduced pressure, passes via 18 into the second stage ammonium carbamate decomposer vessel 19. Vessel 19 is similar in design and function to vessel 10 previously described. Heat is preferably provided for the shell side of vessel 19 by contacting off-gas stream 16 with an aqueous ammonium carbamate solution 20 obtained from a later stage of the process. Streams 16 and 20 are passed via 21 into the shell side of vessel 19 at a temperature between about 250° F. to 350° F., and subsequently leave vessel 19 via line 22 as a mixed gas-liquid stream. Gas absorption and reaction takes place when streams 16 and 20 are combined. This liberates heat which accomplishes the final decomposition of residual ammonium carbamate present in stream 18 at a stream temperature between about 150° F. to 230° F. As previously discussed in connection with the first stage of decomposition, operating temperature is primarily a function of pressure. The urea product stream now leaves vessel 19 via 23, and passes into vessel 24 which is a liquid-gas separator of design and function similar to unit 14 previously described. The product urea solution, containing minute quantities of ammonia and carbon dioxide, is passed via 25 to known urea finishing operations such as prilling, designated as 26, and finally leaves via 27 as finished urea product.

Returning now to separator vessel 24, a final off-gas stream 28 is derived from the second stage decomposition and contains ammonia, carbon dioxide and water vapor. Optional stream 29, consisting of a small ammonia-containing stream derived from urea finishing operations, may be added to stream 28 at this point. The combined off-gas stream 30 is recovered at a pressure and temperature which correspond closely to conditions in the second stage of carbamate decomposition, with gas composition consisting primarily of ammonia, carbon dioxide and water vapor in proportions dependent upon operating variables. Usually the gas will contain about 40% ammonia, 25% carbon dioxide and 30% water vapor.

Gas stream 30 is passed into condenser-stripper vessel 31 below the lower packed section 32. Vessel 31 will usually contain a second upper packed section 33 for accurate temperature control, however section 33 may be omitted in certain cases if adequate process control is attainable and process upsets are prevented by suitable process control instrumentation. A bubble cap section 34 is provided in the upper section of vessel 31, for final purification of the rising gas stream. The entering gas stream 30 passes upwards through packed sections 32 and 33 and bubble cap section 34. In each section the gas is scrubbed with an aqueous ammonia-ammonium carbamate solution, whereby carbon dioxide is removed from the gas. In section 32 the scrubbing also cools the gas stream, preferably to a temperature between about 125° F. to 140° F. This cooling serves to remove most of the carbon dioxide from the gas stream, as well as condensing water vapor and some ammonia. The lower the temperature to which the gas stream is cooled, the more water vapor and carbon dioxide will be removed. Thus above 140° F. an insufficient amount of carbon dioxide is removed from the gas stream, while below 125° F. the scrubbing solution may deposit solid carbamate.

The warmed aqueous solution collected at the bottom of vessel 31 at a temperature between about 130° F. to 145° F. consists essentially of a concentrated ammonium carbamate solution in equilibrium with excess ammonia, and contains about 32% ammonia, 32% carbon dioxide and 36% water. This solution is removed via line 35 and partially recycled via 36, with the balance passing to other parts of the process via 37. Recycle stream 36 is first cooled in cooler 38 to a temperature between about 125° F. and 140° F., and is then recycled via 39 to vessel 31 above packed sections 32. As previously described, its primary function is to cool and scrub the gas stream in packed section 32, thereby simultaneously condensing and removing carbon dioxide, together with water vapor and some ammonia.

The remaining gas stream now passes upwards through separator 40 and enters packed section 33. Separator 40 serves to recover downflowing liquid solution from 33, while allowing upward gas flow. Packed section 33 has a function and operation similar to packed section 32 previously described. The gas stream enters the bottom of section 33 with a carbon dioxide content of about 5%, and consists mostly of ammonia. The scrubbing solution in section 33 is a dilute ammonium carbamate solution containing excess ammonia, and it is withdrawn via line 41 at a temperature below 120° F., cooled in cooler 42 to about 115° F. and then recycled via 43 to vessel 31, above section 33. Thus section 33 differs from section 32 in having a lower temperature level and a weaker scrubbing solution. The carbon dioxide content of the gas stream is lowered from about 5% to about 0.3% to 0.5% by the scrubbing step in section 33.

The gas stream now passes upwards through bubble cap sections 34. A temperature gradient is maintained in section 34, with the top plate being cooled to a liquid phase temperature of about 50° F. or less, either by cooling coils or by flashing in a slight amount of ammonia via 44. Thus the liquid phase on the top tray is a strong cold ammonia solution containing about 55% ammonia with only a very minor carbon dioxide content, while the liquid phase on the bottom tray is warm and lower in free ammonia, but contains about 10% to 20% ammonium carbamate. The gas stream is thus essentially freed of carbon dioxide content in section 34, and leaves unit 31 via line 45 at a temperature between about 50° F. to 75° F. as ammonia gas with less than 100 p.p.m. carbon dioxide, together with about 1% by weight of water vapor and inert gases. The maximum allowable gas temperature at the top of section 34 is primarily a function of pressure. Thus if unit 31 is operated at 15 p.s.i.g., the outlet gas temperature must be maintained below 80° F. to insure complete removal of carbon dioxide. At 50 p.s.i.g., the maximum allowable temperature is 85° F. In any case, the gas must be cooled to below 100° F. with lower temperature being required at lower pressures.

Gas stream 45 is recycled to urea synthesis, and is preferably first compressed to an intermediate pressure between about 200 p.s.i.g. to 400 p.s.i.g. in gas compresser 46. The partially compressed ammonia gas stream 47 then joins another recycle stream of substantially pure ammonia, which is produced at an elevated pressure in a manner to be subsequently described.

Returning now to low pressure condenser-stripper vessel 31, liquid solution stream 37, previously described, is drawn off and compressed to an elevated pressure between about 200 p.s.i.g. to 400 p.s.i.g. by pump 48. The resulting high pressure liquid stream 20 is combined with first stage off-gas stream 16 as previously described. The resulting hot mixed gas-liquid stream is passed into the shell side of vessel 19 via 21 and withdrawn as a mixed gas-liquid stream 22 at a somewhat lower temperature between about 250° F. to 300° F. Stream 22 is now passed into high pressure condenser-stripper 49. Unit 49 has a function and mode of operation similar to that of low pressure unit 31 previously described, except that unit 49 is operated at a pressure level of about 200 p.s.i.g. to 400 p.s.i.g. and serves to recover pure ammonia from the first stage off-gas at high pressure, thus eliminating considerable gas compression requirements of the prior art.

Stream 22 is scrubbed first in packed section 50, and the remaining gas is further scrubbed in packed section 51 and refluxed in bubble cap plates section 52. A recycle gas stream, consisting essentially of pure ammonia, is removed at high pressure via 53, and combined with recycle ammonia stream 47 to yield a total recycle ammonia stream 54. Stream 54 is passed into cooler condenser 55, which is cooled by coolant admitted via 56 and removed via 57. Essentially all of the ammonia is condensed to liquid which leaves via 58. A purge stream 59 containing inerts is refrigerated for ammonia recovery, not shown, and is discharged to a stack. The liquid ammonia stream 58 is brought to urea synthesis pressure in pump 60 and returned to urea synthesis via 5.

Returning to high pressure condenser-stripper unit 49, a concentrated ammonia-ammonium carbamate solution is withdrawn via 61. A portion of this stream is returned above packed section 50 via 62, while the balance is recycled to urea synthesis via 63. Stream 63 is first compressed in pump 64, then passes via 65 to heater 66 which is heated by steam admitted via 67 with condensate removal via 68. The resulting stream 6, now at urea synthesis temperature and pressure, is passed into urea synthesis reactor 3.

The operation of unit 49 is similar to that of unit 31, as previously mentioned. An important distinguishing aspect of its operation resides in the operation of unit 49 at the higher pressure level of 200 p.s.i.g. to 400 p.s.i.g. Consequently, a considerably higher temperature profile is allowable in this unit than was the case for unit 31.

In essence, the condenser-stripper unit serves to remove carbon dioxide from the gas stream by condensing and dissolving it in the liquid bottoms solution as ammonium carbamate. At higher pressures, ammonium carbamate is condensable to liquid at higher temperatures. Thus the temperature requirements in the high pressure condenser stripper unit are not as great, for substantially complete carbon dioxide removal.

Referring to unit 49, a portion of the concentrated liquid bottoms drawoff stream 61 is recycled to the unit via 62. Stream 62 is first cooled in cooler 69, and then cooled recycle stream 70 is returned to unit 49 above packed section 50. The gaseous component of incoming stream 22 passes upward through packed section 50, and is cooled and scrubbed by recycle stream 70. Thus the gas phase temperature below section 50 is between about 250° F. to 300° F. in normal operation, while the residual gas phase above unit 50 is at a temperature between about 200° F. to 212° F.

Further cooling of the rising gas stream takes place in packed section 51, with recycling dilute solution withdrawn from above separator 76 via 71 at a temperature between about 200° F. to 212° F., cooled in cooler 72, and returned via 73 at a temperature between about 140° F. to 150° F. The gas phase is finally cooled and refixed in bubble cap sections 52, with top plate cooling provided by cooling coils or by ammonia flashed in via 74. The final gas phase temperature above bubble cap sections 52 is maintained between about 110° F. to 120° F., with substantially pure ammonia drawn off via 53 and recycled to urea synthesis as previously described.

The teaching of the present invention resides essentially in the application of condenser-strippers in such a manner as to maintain pressure levels within the system. Since a major portion of ammonium carbamate is decomposed in the first stage decomposer, the resulting off-gas stream which is removed at 200 p.s.i.g. to 400 p.s.i.g. represents a relatively large quantity of gas. This gas stream also contains most of the excess ammonia originally present in the urea synthesis. By the teaching of the present invention, it becomes possible and practical to recover a large stream of pure ammonia gas from this off-gas stream at the elevated pressure. The pure ammonia gas is thus readily liquefied by cooling only, with no mechanical gas compression requirement for this stream.

Numerous variations within the scope of the present invention will occur to those skilled in the art. Thus for example, in some instances it might be advisable or necessary to avoid the usage of stream 20 as a reactant with off-gas stream 16 to provide heat in unit 19. This process sequence might be eliminated for a variety of reasons, such as if insufficient heat was developed for complete carbamate decomposition. Stream 20 would then be replaced by a more dilute stream of carbamate or aqueous ammonia, or in some cases even water could be utilized instead of stream 20. Under such circumstances, stream 20 would be partially or wholly eliminated, and stream 37 would then be recycled by compression in pump 48 followed by addition of the compressed liquid stream 75 to streams 61 or 63.

Another possible procedure, in cases where off-gas stream 16 is of a relatively low magnitude, could be to pass stream 16 directly into the bottom section of unit 49 instead of the present flow via line 21, unit 19 and line 22. In this situation, stream 37 would be recycled via pump 48 to line 75, and unit 19 would be heated by steam or other suitable means.

An example of an industrial urea synthesis process utilizing the teaching of the present invention will now be described. This urea process was operated with an overall 3 to 1 ratio of ammonia to carbon dioxide in the reactor feed. Reactor operating pressure was 3500 p.s.i.g. and temperature about 365° F. A 48% yield of urea was obtained in the reactor effluent, based on carbon dioxide feed. The first stage of carbamate decomposition achieved a 68% decomposition of unconverted ammonium carbamate at a pressure of 235 p.s.i.g. and temperature of 266° F. A first stage off-gas stream was separated at the rate of 6300 pounds per hour, containing 34% carbon dioxide, 57% ammonia and 8% water vapor by weight, plus inerts. This gas stream was mixed with 3300 pounds per hour of a liquid recycle stream, derived from the low pressure condenser-stripper bottoms and containing 32% ammonia, 32% carbon dioxide and 36% water. The mixed gas-liquid stream was passed into the shell of the second stage decomposer at 280° F. and 230 p.s.i.g., and used to provide heat for final low-pressure carbamate decomposition. The process stream was thus treated for final carbamate decomposition at a pressure of 15 p.s.i.g. and temperature of 200° F.

A final off-gas containing 41% ammonia, 27% carbon dioxide, and 31% water vapor was recovered from the second stage decomposer separator at a rate of 3600 pounds per hour. A small off-gas stream derived from urea storage and consisting of about 200 pounds per hour total flow was combined with this final off-gas, and the combined gas stream was passed into the low pressure condenser-stripper at 15 p.s.i.g. The gas stream was cooled and partially condensed in this unit, with a net yield of 520 pounds per hour of pure ammonia gas being achieved. The liquid bottom was removed at 139° F., and a 3300 pounds per hour drawoff was pressurized to 235 p.s.i.g. and sent to contact first stage off-gas as previously described. The balance of the bottoms was cooled to 135° F. and recycled above the lower packing section. The gas phase above the lower packing contained 5% carbon dioxide, 5% water vapor, with the balance primarily consisting of ammonia plus a small quantity of inerts. This gas stream was further cooled in the upper packing section, with scrub liquid drawoff at 116° F. and recycled at 115° F. The resulting gas stream above the upper packing contained 0.5% carbon dioxide, 3% water vapor, with balance ammonia and inerts. This gas stream was refluxed, and essentially freed of carbon dioxide in the final bubble-cap section, which contained seven plates. The bottom plate had a liquid phase temperature of 107° F. and carbon dioxide content of 11.75%, while the top plate had a liquid phase temperature of 55° F. and carbon dioxide content of 0.02%. About 40 pounds per hour of liquid ammonia was admitted below the top plate to maintain this temperature profile. The final pure ammonia gas stream totalled 560 pounds per hour, and contained only 25 p.p.m. of carbon dioxide and 0.5% water vapor. The water was readily removed during the subsequent gas compression.

The mixed gas-liquid stream derived at 235 p.s.i.g. from the shell side of the second stage decomposer was passed into the high pressure condenser-stripper. This stream amounted to 9600 pounds per hour, and consisted of about 48% ammonia, 34% carbon dioxide and 17% water vapor. The stream was cooled and scrubbed with concentrated carbamate solution in the lower packed section from an initial temperature of 260° F. to a residual gas temperature of about 210° F. The residual gas, amounting to 1300 pounds per hour and containing 3% carbon dioxide, 3% water vapor and 6% inerts with the balance consisting of ammonia, was further scrubbed in the upper packed section. Here a relatively dilute scrub solution containing about 25% water, 24% carbon dioxide and 50% ammonia was used, with heated solution withdrawn at 145° F. and cooled to 140° F. prior to recycle. The resulting gas phase above the upper packed section contained 0.5% carbon dioxide and 1.5% water vapor, balance ammonia and inerts.

This gas stream was refluxed and completely freed of carbon dioxide in the top bubble cap plates section of the unit, with the bottom plate liquid phase at 135° F. and the top plate liquid phase maintained at 115° F. by injection of 100 pounds per hour of liquid ammonia below this plate. The final off-gas consisted of 1150 pounds per hour of essentially pure ammonia gas at 235 p.s.i.g. and 115° F., and was passed directly to an ammonia condenser where the ammonia was liquefied and 0.5% water vapor was removed. Carbon dioxide content was less than 80 p.p.m.

This invention is not limited to the specific combination of the aforementioned example, since modifications of operating variables or processing steps within the scope of the present invention will readily occur to those skilled in the art, in addition to those variations previously mentioned.

I claim:

1. In a process for urea synthesis which comprises reacting ammonia, carbon dioxide and recycle aqueous ammonium carbamate solution at a highly elevated pressure, reducing the pressure of the resulting urea-containing process stream to an intermediate level, heating the process stream to decompose a portion of the contained ammonium carbamate, separating a first off-gas comprising ammonia, carbon dioxide and water vapor, further reducing the pressure of the residual urea-containing process stream, further heating the residual process stream to decompose the balance of contained ammonium carbamate, separating a second off-gas comprising ammonia, carbon dioxide and water vapor from the final residual process stream, said final residual process stream comprising product aqueous urea solution, the improvement which comprises scrubbing said second off-gas with cold aqueous ammonia-ammonium carbamate solution whereby said off-gas is cooled and a portion thereof is condensed and absorbed into said solution and said solution is heated, further cooling and refluxing the residual gas portion of said second off-gas whereby substantially all carbon dioxide is removed from said second off-gas, recycling the final residual second off-gas comprising ammonia free of carbon dioxide to urea synthesis, cooling and recycling a portion of said aqueous ammonia-ammonium carbamate solution to said scrubbing of second off-gas, compressing the balance of said solution to said intermediate pressure level, combining said compressed solution with said first off-gas, scrubbing the resulting hot mixed gas-liquid stream with warm aqueous ammonia-ammonium carbamate solution whereby said mixed stream is cooled and a portion of the gas phase is condensed and absorbed into said solution and said solution is heated, further cooling and refluxing the residual gas phase whereby substantially all carbon dioxide is removed from said gas phase, recycling the final residual gas phase comprising ammonia free of carbon dioxide to urea synthesis, cooling and recycling a portion of said warm aqueous ammonia-ammonium carbamate solution to said scrubbing of hot mixed gas-liquid stream, and compressing and recycling the balance of said solution to urea synthesis as said recycle aqueous ammonium carbamate solution.

2. Process of claim 1, in which said hot mixed gas-liquid stream produced by combining said compressed solution with said first off-gas, is first cooled by heat exchange with process stream whereby said process stream is heated to decompose the balance of contained ammonium carbamate and produce said second off-gas, before said hot mixed gas-liquid stream is scrubbed with warm aqueous ammonia-ammonium carbamate solution.

3. In a process for urea synthesis which comprises reacting ammonia, carbon dioxide and recycle aqueous ammonium carbamate solution in an overall ammonia-carbon dioxide molar ratio between 2 to 1 and 5 to 1 and at urea synthesis pressure between 2000 p.s.i.g. to 6000 p.s.i.g. and temperature between 320° F. to 430° F., reducing the pressure of the resulting urea-containing process stream to the range of 200 p.s.i.g. to 400 p.s.i.g., heating the process stream at a temperature between 240° F. to 300° F. whereby a major portion of the contained ammonium carbamate is decomposed, separating a first off-gas comprising ammonia, carbon dioxide and water vapor, further reducing the pressure of the residual urea-containing process stream to the range of 5 p.s.i.g. to 50 p.s.i.g., further heating the residual process stream at a temperature between 150° F. to 230° F. to decompose the balance of contained ammonium carbamate, separating a second off-gas comprising ammonia, carbon dioxide and water vapor from the final residual process stream, said final residual process stream comprising product aqueous urea solution, the improvement which comprises scrubbing said second off-gas with cold aqueous ammonia-ammonium carbamate solution whereby said second off-gas is cooled to a temperature between 125° F. to 140° F. and a portion thereof is condensed and absorbed into said solution, said solution being heated from an initial temperature between 110° F. to 140° F. to a final temperature between 115° F. to 145° F. by said scrubbing step, further cooling and refluxing the residual gas portion of said second off-gas to a final temperature below 100° F. whereby substantially all carbon dioxide is removed from said second off-gas, recycling the final residual second off-gas comprising ammonia at 5 p.s.i.g. to 50 p.s.i.g. and free of carbon dioxide to urea synthesis, cooling and recycling a portion of said aqueous ammonia-ammonium carbamate solution to said scrubbing of second off-gas, compressing the balance of said solution to said intermediate pressure of first carbamate decomposition in the range of 200 p.s.i.g. to 400 p.s.i.g., combining said compressed solution with said first off-gas, scrubbing the resulting hot mixed gas-liquid stream with warm aqueous ammonia-ammonium carbamate solution whereby the residual gas phase of said mixed stream is cooled to a temperature between 150° F. to 220° F. and a portion of said mixed stream is condensed and absorbed into said solution and said solution is heated, further cooling and refluxing the residual gas phase to a final temperature between 110° F. to 120° F. whereby substantially all carbon dioxide is removed from said gas phase, recycling the final residual gas phase comprising ammonia at 200 p.s.i.g. to 400 p.s.i.g. and free of carbon dioxide to urea synthesis, cooling and recycling a portion of said warm aqueous ammonia-ammonium carbamate solution to said scrubbing of hot mixed gas-liquid stream, and compressing and recycling the balance of said solution to urea synthesis as said recycle aqueous ammonium carbamate solution.

4. Process of claim 3, in which said hot mixed gas-liquid stream produced by combining said compressed solution with said first off-gas, is first cooled to a temperature between 250° F. to 300° F. by heat exchange with process stream, whereby said process stream is heated at 5 to 50 p.s.i.g. and 150° F. to 230° F. to decompose the balance of contained ammonium carbamate, before the said hot mixed gas-liquid stream is scrubbed with warm aqueous ammonia-ammonium carbamate solution.

References Cited in the file of this patent

UNITED STATES PATENTS

| 1,898,093 | Miller | Feb. 21, 1933 |
| 2,701,262 | Cook | Feb. 1, 1955 |
| 2,807,574 | Hirano et al. | Sept. 24, 1957 |
| 2,116,881 | De Ropp | May 10, 1958 |
| 2,848,493 | Dewling et al. | Aug. 19, 1958 |
| 2,913,493 | Sze et al. | Nov. 17, 1959 |

FOREIGN PATENTS

| 205,506 | Austria | Oct. 10, 1959 |
| 528,743 | Canada | Aug. 7, 1956 |
| 535,406 | Canada | Jan. 8, 1957 |
| 560,612 | Canada | July 22, 1958 |